(12) United States Patent
Majumdar

(10) Patent No.: US 10,387,784 B2
(45) Date of Patent: Aug. 20, 2019

(54) TECHNICAL AND SEMANTIC SIGNAL PROCESSING IN LARGE, UNSTRUCTURED DATA FIELDS

(71) Applicant: KYNDI, INC., Redwood City, CA (US)

(72) Inventor: Arun Majumdar, Alexandria, VA (US)

(73) Assignee: KYNDI, INC., Redwood City, CA (US)

( * ) Notice: Subject to any disclaimer, the term of this patent is extended or adjusted under 35 U.S.C. 154(b) by 687 days.

(21) Appl. No.: 14/965,728

(22) Filed: Dec. 10, 2015

(65) Prior Publication Data

US 2016/0171369 A1    Jun. 16, 2016

Related U.S. Application Data

(60) Provisional application No. 62/090,178, filed on Dec. 10, 2014.

(51) Int. Cl.
*G06N 5/04* (2006.01)
*G06F 16/00* (2019.01)
*G06F 17/27* (2006.01)

(52) U.S. Cl.
CPC .............. *G06N 5/04* (2013.01); *G06F 16/00* (2019.01); *G06F 17/2775* (2013.01); *G06F 17/2785* (2013.01)

(58) Field of Classification Search
USPC .......................................................... 706/46
See application file for complete search history.

(56) References Cited

U.S. PATENT DOCUMENTS 8,005,858 B1    8/2011  Lunch et al.

8,566,321 B2 * 10/2013  Majumdar ........ G06F 17/30569
707/737

(Continued)

FOREIGN PATENT DOCUMENTS

WO    WO 2008/151818 A2    12/2008

OTHER PUBLICATIONS

Semantically similar document retrieval framework for language model speaker adaptation Ján Staš; Daniel Zlacký; Daniel Hládek 2016 26th International Conference Radioelektronika (RADIOELEKTRONIKA) Year: 2016 pp. 403-407 IEEE Conferences.*

(Continued)

*Primary Examiner* — Michael B Holmes
(74) *Attorney, Agent, or Firm* — Oblon, McClelland, Maier & Neustadt, L.L.P.

(57) ABSTRACT

An analytical method and apparatus is provided for analyzing and interpreting signals from unstructured data to identify and reason about underlying concepts. The method and apparatus include functions of generating qualitative and quantitative representations of explicit semantic concepts and implicit related or associated concepts, and defining a Semantic Boundary Index used for real-time processing of unstructured data fields or streams in a manner that characterizes, stores, measures, monitors, enables transactional updates or analyses of implicit and explicit information or evidence to identify explicit and implicit or hidden semantic concept, the semantic boundary index being produced by dynamic partitioning through semiotic-based signal processing. The semiotic-based signal processing occurs through agent-based dynamic sensing, characterizing, storing, monitoring, reasoning about and partitioning of unstructured data into core semantic elements.

40 Claims, 9 Drawing Sheets

(56) References Cited

U.S. PATENT DOCUMENTS

| | | | | |
|---|---|---|---|---|
| 9,158,847 | B1* | 10/2015 | Majumdar | G06F 16/951 |
| 9,928,102 | B2* | 3/2018 | Majumdar | G06F 9/30178 |
| 10,120,933 | B2* | 11/2018 | Majumdar | G06F 16/35 |
| 2007/0226628 | A1 | 9/2007 | Schlack | |
| 2010/0211594 | A1 | 8/2010 | Penders et al. | |
| 2012/0191716 | A1 | 7/2012 | Omoigui | |
| 2012/0233188 | A1* | 9/2012 | Majumdar | G06F 17/30734 707/756 |
| 2012/0265779 | A1 | 10/2012 | Hsu et al. | |
| 2014/0032580 | A1* | 1/2014 | Majumdar | G06F 17/30734 707/756 |
| 2016/0171041 | A1* | 6/2016 | Majumdar | G06F 16/35 707/756 |
| 2016/0171212 | A1* | 6/2016 | Majumdar | G06F 9/30178 713/164 |
| 2016/0171369 | A1* | 6/2016 | Majumdar | G06N 5/04 706/46 |
| 2016/0173124 | A1* | 6/2016 | Majumdar | H03M 7/04 708/203 |
| 2016/0180240 | A1* | 6/2016 | Majumdar | G06N 3/006 706/46 |
| 2016/0328253 | A1* | 11/2016 | Majumdar | G06F 9/45504 |
| 2018/0137155 | A1* | 5/2018 | Majumdar | G06N 10/00 |
| 2018/0239763 | A1* | 8/2018 | Majumdar | H04L 41/046 |
| 2018/0240043 | A1* | 8/2018 | Majumdar | H04L 41/046 |

OTHER PUBLICATIONS

Making Unstructured Data SPARQL Using Semantic Indexing in Oracle Database Souripriya Das; Seema Sundara; Matthew Perry; Jagannathan Srinivasan; Jayanta Banerjee; Aravind Yalamanchi 2012 IEEE 28th International Conference on Data Engineering Year: 2012 pp. 1405-1416 IEEE Conferences.*

Efficient Semantic Indexing for Image Retrieval Chandrika Pulla; Suman Karthik; C. V. Jawahar 2010 20th International Conference on Pattern Recognition Year: 2010 pp. 3276-3279 IEEE Conferences.*

Semantics-Based Video Indexing using a Stochastic Modeling Approach Yong Wei; Suchendra M. Bhandarkar; Kang Li 2007 IEEE International Conference on Image Processing Year: 2007, vol. 4 pp. IV-313-IV-316 IEEE Conferences.*

Physiological Measurement A combined segmenting and non-segmenting approach to signal quality estimation for ambulatory photoplethysmography J D Wander and D Morris, Published Nov. 19, 2014 •© 2014 Institute of Physics and Engineering in Medicine Physiological Measurement, vol. 35, No. 12 pp. 1-20.*

ScienceDirect Elsevier Journal of Experimental Child Psychology vol. 108, Issue 3, Mar. 2011, pp. 453-468 A latent variables examination of processing speed, response inhibition, and working memory during typical development Tara McAuley, Desirée A. White.*

Journal of Nursing Measurement, vol. 14, No. 2, Fall 2006 Field Testing, Refinement, and Psychometric Evaluation of a New Marilyn J.Rantz, PhD, RN, FAAN et al., 2006 Springer Publishing Company.*

International Search Report and Written Opinion dated Feb. 26, 2016 in PCT/US15/65075 filed Dec. 10, 2015.

Extended European Search Report dated Jun. 16, 2018 in European Patent Application No. 15868346.6, 8 pages.

Rieger, B.B., "Semiotic Cognitive Information Processing: Learning to Understand Discourse. A Systemic Model of Meaning Constitution", In: "Adaptivity and Learning", 2003, XP055483820, pp. 347-403.

European Office Action dated Jul. 10, 2018 in European Patent Application No. 15868346.6. 1 page.

European Office Action dated Apr. 16, 2019 in European Patent Application No. 15868346.6, 5 pages.

* cited by examiner

Using a training set of surprises from correlated sources, e.g., using science-fiction literature as one source and patent-literature as another source, build the SBIs of each source.
710

Compute the similarities between SBIs using a distance matrix or k-means clustering or other algorithms.
720.

For each of the tagged data, compute the image of the SBI using appropriately choses Stock Market Technical indicators representing: volume, cycles, momentum and rates of change.
730

Compute the skewness, kurtosis, deviation and exponential moving averages
740

Compare the data tagged as "surprise" versus the data tagged otherwise and use 50% of the difference in values between the step 740 of results to compute a "threshold."
750

Apply the method to new data and for any date exceeding the threshold, mark the data for "surprise."
760

Return the "surprise" data structure SBIs
770

With a training set of surprises from pairs of correlated sources: for example, using science-fiction literature as one source and patent-literature as source pair, and a pair from New Reports and Political Events, build the Algorithm for Anomaly and Surprise for each pair.
810

Compute the skewness, kurtosis, deviation and exponential moving averagess.
820.

Apply a weighting to the difference until it causes a 50% shift in the thresholds for the Algorithm for Anomaly and Surprise. This is a Dimensional Stress Index.
830

With respect to the sampling window boundary, apply the method to new data and for any data:
1. increasing the threshold, mark it as stressor;
2. reducing the threshold mark it as a relaxor;
3. dilating the position of the threshold mark it as a retardant; and
4. Contracting the position of the threshold, mark it as an accelerant.
840

Return the Dimensional Stress Indexes
850

TECHNICAL AND SEMANTIC SIGNAL PROCESSING IN LARGE, UNSTRUCTURED DATA FIELDS

CROSS-REFERENCE TO RELATED APPLICATIONS

This application is based upon and claims the benefit of priority to provisional U.S. Application No. 62/090,178, filed Dec. 10, 2014, the entire contents of which are incorporated herein by reference.

FIELD

Embodiments disclosed herein relate generally to analytical algorithms, methods and processes for analyzing and interpreting signals from unstructured data to identify and reason about underlying concepts that can only be indirectly accessed through analogs and proxies to the said concepts.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Business information processing applications depend on having a technical understanding and the ability to mine unstructured data stores. These business information processing applications can include assessment of technologies, market trends, competitive products, technical systems and functions, and new and over the horizon emerging markets Unstructured data is neither homogenous in format, in technical form or structure, nor in its method of storage and retrieval. Unstructured data is, by definition, not stored, curated, formatted or made to be accessible in a standardized, machine-readable, cross-computer hardware and software platform manner.

To-date assessments by portfolio analyst concerned with information hidden in unstructured data fields and its impact on identification of risks, threats and opportunities has been done using either technical (e.g., technical functions and measures) and fundamental (e.g., semantic data, information and ontologies) analytics. However, full integration of technical and fundamental analytics to include the ability to identify and use informational signals from unstructured data, both implicit and explicit in origin, for the purpose of identification and characterization of "pre-requisite" conditions for certain outcomes to occur (e.g., risk proxies, analogies and analogies of analogies) has not been realized.

A significant challenge facing natural language processing (NLP) is that geometric increases in unstructured data create continuously changing text-streams that bring continuously changing meaning. Modern unstructured data is not amenable to "after-the-fact" processing or expert-system-dependent filtering, sifting, sorting and computing for the timely delivery of analytic results. Instead, only a system that can deliver real-time filtering, sifting, sorting, and computing on unstructured data content and that adapts in outputs as the underlying meaning of the data changes, is needed. Traditional approaches to syntactic and semantic processing, which is focused on word-, sentence-, paragraph-, document- and file-units is insufficient to the challenge because they do not address identifying the presence of hidden or implicit concepts that add risk to the purely symbolic based (i.e. dictionary) semantic interpretations. Specifically, traditional natural language processing (NLP) and computational linguistics, as represented by the disciplines of LSI/LSA (2), probabilistic and statistical data-driven models of semantic search (3), expert models and systems (4), concept graphs (5), semantic graphs (6), meta-tagging (7), and related fields, do not address the technical requirements for real-time processing of unstructured data for analog discovery.

For large data sets, similarities are usually described in the form of a symmetric matrix that contains all the pairwise relationships between the data in the collection. Unfortunately, pairwise similarity matrices do not lend themselves for numerical processing and visual inspection. A common solution to this problem is to embed the objects into a low-dimensional Euclidean space in a way that preserves the original pairwise proximities as faithfully as possible: for example, LSA, PCA and other such vector methods.

One approach, known as multidimensional scaling (MDS) or nonlinear mapping (NLM), converts the data points into a set of real-valued vectors that can subsequently be used for a variety of pattern recognition and classification tasks. Multidimensional scaling (MDS) is a statistical technique that attempts to embed a set of patterns described by means of a dissimilarity matrix into a low-dimensional plane in a way that preserves their original (semantically pairwise) interrelationships with minimum error and distortion. However, current MDS algorithms are very slow, and their use is limited to small data sets.

SUMMARY

The present invention can be applied to all forms of risk quantification using analogs derived from signals extracted from unstructured data and that these analogs proxies for risk identification and quantification that may be hidden or implicit, not explicit, in data about any subject of interest.

The present invention defines a method to enable computer systems to systematically and flexibly mine unstructured data content and provide users access to the hidden meaning and content in heterogenous files in the form of risk-analogs or risk proxies that are essential to time-critical, analytical findings regarding the present and projected future status of systems, products, markets, trends or other matters of interest.

The present invention discloses a method for semantic signal processing from unstructured text fields with specific representations of for a computational data structure for representing ignorance within data as a function of distinguishability and indistinguishalbility of signals derived from data and its use with ontological frameworks for analysis of anomalies or surprises. Signal processing, as described herein, is through convergent agent-based semiotic signal processing in unstructured data flows. Technical signals are generated from unstructured information include signals generated by computer encoding of tokens, objects, letters, symbols, words, document identifiers, or other atoms in a file. Semantic signals are generated from unstructured information in the present invention and are represented by three kinds of Semantic Boundary Indices: indices that classify data based on indistinguishability; indices that classify data based on distinguishability; and, indices that classify data based on ignorance. These classifications are specific to the present invention and are used to derive other signals that indicate gaps, or holes or the presence of implicit or indirect conceptual entities. This invention defines unique semantic boundary indices that can be aggregated to form the analogs or proxies which serve as interpretations of the signals.

BRIEF DESCRIPTION OF THE DRAWINGS

A more complete understanding of this disclosure is provided by reference to the following detailed description when considered in connection with the accompanying drawings, wherein:

FIG. 7 shows a flow diagram of a process to detect surprises and anomalies, according to one implementation;

FIG. 8 shows a flow diagram of a process to determine a dimensional stress index, according to one implementation.

DETAILED DESCRIPTION

Figure 1:
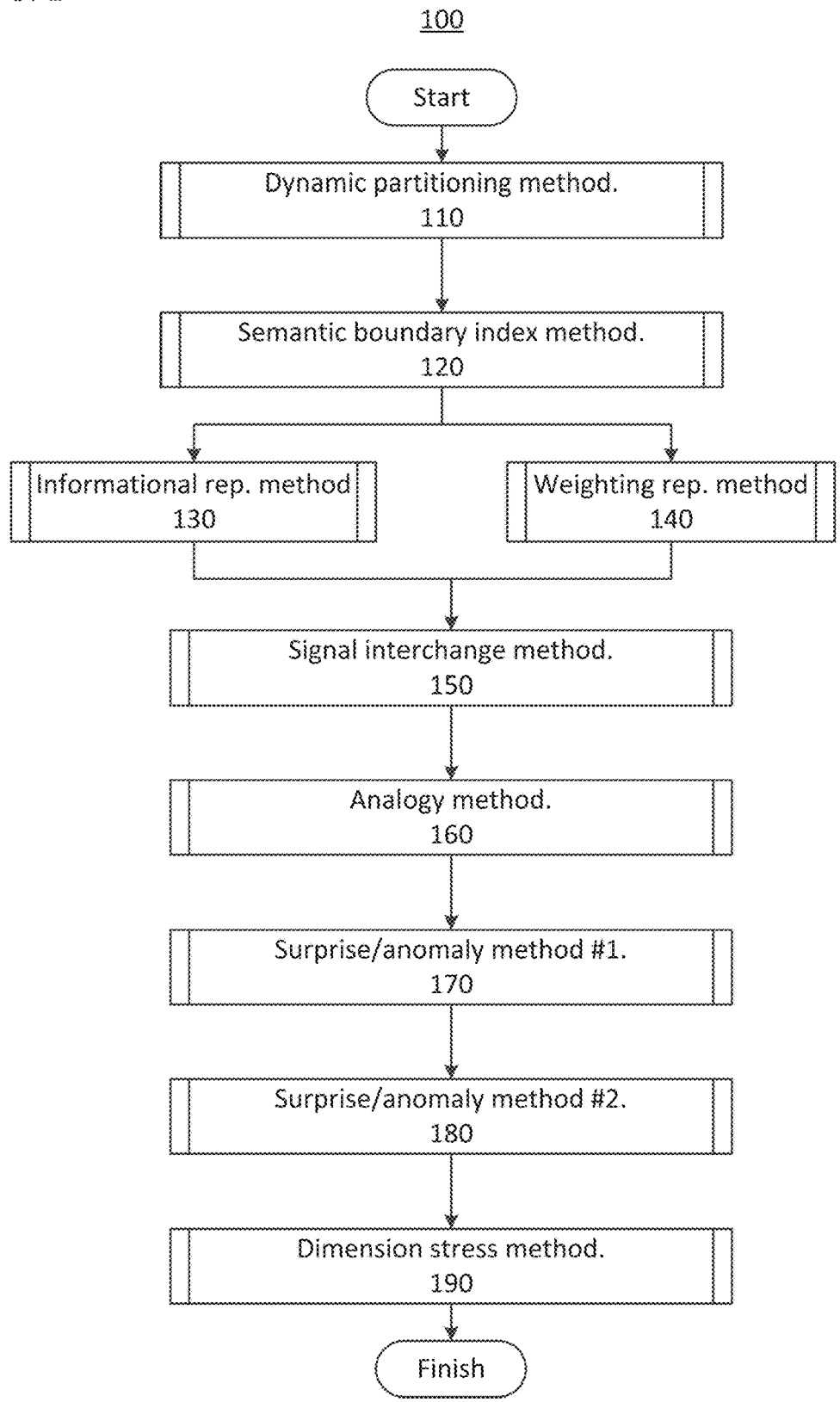
FIG. 1 shows a flow diagram of a method for semantic signal processing, according to one implementation.

The methods described herein provide analytical algorithms, methods, and processes for analyzing and interpreting signals from unstructured data to identify and reason about underlying concepts that can only be indirectly accessed through analogs and proxies to the said concepts. The present disclosure generates qualitative and quantitative representations of explicit semantic concepts and their implicit related or associated concepts, including analogies, as analogs or proxies. The methods described herein use a data structure and processing method called a Semantic Boundary Index (SBI) that is used for real-time processing of unstructured data fields or streams in a manner that characterizes, stores, measures, monitors, enables transactional updates or analyses of implicit and explicit information or evidence to identify explicit and implicit or hidden semantic concepts, including analogies.

The SBIs are produced by dynamic partitioning using semiotic-based signal processing. This processing occurs through agent-based dynamic sensing, characterizing, storing, monitoring, reasoning about, and partitioning of unstructured data into core semantic elements. Partitions are defined according to thresholds of the SBI values and their associated meaning as assigned by core values attributed to the analyst, and resultant feedback provided by the machine. The SBIs are numerical proxies for machine-generated, fully integrated statements about the technical and semantic signals and their meaning in terms of semantic and syntactic partitions that occur within any set of unstructured data based on the underlying content contained within it.

The semantic boundaries of the SBIs can be tuned according to the boundary types that have the greatest explanatory or descriptive value to the analyst. The SBIs are domain-independent, can change in real-time and are continuously assessed, measured, processed and evaluated using the methods described herein to define and characterize downstream core semantic elements, including signals-based analog-types, concept maps, ontologies, information-gaps, characterization of trends, instances of technical functions and metrics and their characterization, level of development in the domain assessment, and other semantic elements.

Thus, the methods described herein can advantageously provide fully automated evaluation of unstructured data for discovery of qualitative and quantitative analogs for analogy formation in surprise or anomaly identification and prediction as well as fast retrieval of implied or explicit, evidence from analogs and proxies created using the SBIs for forecasting or predictive what-if scenario identification.

Further advantages of the methods described herein include:

(1) Networks of implicit concepts in unstructured data that were non-obvious before are made explicit through a representation of analogs and proxies after application of the present embodiment which produces three classes of signals: those that represent data through indistinguishability relations, those that represent data through relational distinctions and those that represent data via a measure of ignorance derived through the interactions between distinguishability and indistinguishability.

(2) Whereas in conventional data processing paradigms the identification of analogies is difficult and in some cases impossible without extensive human effort, the method described herein takes advantage of signals extraction from data to produce analogs or proxies of the underlying concepts, which can be used with an analogical reasoning engine for identifying related concepts.

(3) The signals and the derived analogs characterize and label dimensional stresses between semantic boundary layers and thusly revealing the potential fracture and stress points within data signal fields that are shown to represent unstructured data-sets.

(4) Signal processing in unstructured data fields enables domain independent information processing and is applicable to any field for which unstructured data is a store of knowledge. This includes, but is not limited to technical and scientific fields (e.g., physics, biology, chemistry, materials science, engineering and interdisciplinary fields, such as bio-physics, bio-engineering, genetic engineering and beyond); general business fields (e.g., finance, marketing, management, operations, supply chain management, and beyond); university and non-governmental organization fields (e.g., administration, knowledge management, funding and grant management, library sciences and beyond); government fields (e.g., administration, public policy, taxation, laws, national security, research and development portfolio management, and beyond); and any other field for which unstructured data is a repository of relevant information.

(5) The analog representation process is rapid, robust and provides for learning from noisy or distorted data.

(6) Integrated learning through analogies between signal types is trivial to implement with the representation and method and process;

(7) The process and method is applicable to non-verbal or non-linguistic processing (8) The method and process is sufficient to bootstrap to learn language from zero vocabulary through application of interactions with references or open source data sources or users (i.e. humans or other computational agents);

(9) The analog learning procedure projects out common structure of from examples (rejecting believed "noise"), and has a criterion of sufficient evidence and expectation such that positive signals occur when evidence matches expectation. Therefore, the present invention can "gather" implicit negative evidence through data interactions and it's underlying system "learns" from these observed interactions between signals.

(10) Learning means that interactions propagate through a population of agents that adjust their interactions and viewpoints towards the subject at hand. This accounts for many prominent features of semantic change (language evolution in terms of definitions and usage) rather than on innate features of the (human) brain or prescribed aspects of language or fixed vocabularies or hard-coded solutions.

Further, the methods described herein can be applied to all forms of risk quantification using analogs derived from signals extracted from unstructured data and that these analogs proxies for risk identification and quantification that may be hidden or implicit, not explicit, in data about any subject of interest.

The SBIs can be used for analog-based reasoning and signal processing. Analogs and proxies are special patterns of signal vectors that correspond to the patterns of data over logical or temporal time. Once trained, the learned (constructed) network of analogs can be used in a feed-forward manner to project the remaining members of the population. Thus, new/unseen data patterns and/or information can advantageously be discrened and extracted with minimal distortion.

Thus, the methods described herein advantageously couple low level agents with a data representation and computation method of an analog, or a proxy which is a means to measure anything that cannot be directly observed, but can be observed through other factors (i.e. analogous to the factors). Therefore, we introduce the concept of a Semantic Boundary Index, which is a software object that provides an active quantitative data signal measure about the analog playing the role of a referent or interpretant to data that is not directly observable or directly measurable.

The analog discovery processes and methods of the present invention forms a clear rapid knowledge formation and discovery component; a distinct advantage of this approach is that it captures the nonlinear mapping relationship in an explicit function, and allows the scaling of additional information as it may become available, without the need to reconstruct the entire map of signal vectors each time.

The ability to infer analogs from patterns of signals in real-time, as they are generated by multiple characteristics of the computer code that encodes words, sentences, paragraphs, documents and files, is based on non-parametric, non-statistical schemata that derived using a formula for correlation analysis based on similarity computation and signal's pattern catalogs that represent index-structures (i.e. these are a signature) for the analogs or proxies to the indirect or implicit concepts.

The methods described herein provide an extension and unique embodiment of semiosis represented through the use of software agents based on a semiotic theory from American philosopher and logician Charles Sanders Peirce.

Peirce formulated a model of the "sign" in a framework of semiosis in which signs beget signs and of the taxonomies of signs. Peirce described a triadic model made up of the Representamen: the form which the sign takes (not necessarily material); the Object: to which the sign refers and finally, an interaction that must occur in mind of the observer whose result produces the the Interpretant: not an interpreter but rather the sense made of the sign. A sign in the form of a representamen is something which stands to somebody for something in some respect or capacity. The sign stands for something, its object. It stands for that object, not in all respects, but in reference to a sort of idea, sometimes called the ground of the representamen. The interaction between the representamen and the object and eye of the beholder creates the interpretant and is referred to by Peirce as the process of semiosis. Within Peirce's model of the sign, the traffic light sign for 'stop' would consist of: a red light facing traffic at an intersection (the representamen); vehicles halting (the object) and the idea that a red light indicates that vehicles must stop (the interpretant) formulated in the mind of the beholder (i.e. the driver).

Peirce's model of the sign includes an object or referent. The representamen is similar in meaning to pointer to an object. However, the interpretant has a quality unlike that of the signified: it is itself a sign in the mind of the interpreter. Umberto Eco uses the phrase 'unlimited semiosis' to refer to the way in which this could lead (as Peirce was well aware) to a series of successive interpretants (potentially) ad infinitum thus rendering the process of semiosis.

In order to implement the Percean framework, two specific components are required: (i) an autonomous software process that is capable of observation and interpretation; and (ii) a perceptual system that forms signs that can be observed and interpreted;

The two components are provided by, respectively, agent technologies for observation and interpretation; and secondly, a dedicated perception system for creating signs as a function of other signs, which are implemented as time-series signal windows on some underlying data set, whether static or dynamically changing.

Dinah Goldin and Peter Wegner have described the nature of computation by interaction and while Wegner and Goldin do not relate or connect the model to Peirce's semiotic, the interactions between agents interpreting signs for objects and representamens amounts by computation (producing successive sign states) by "interactionism" which Wegner and Goldin prove to be equivalent to Super-Turing machines that can exceed the capabilities and limitations of traditional computing algorithmic models.

Referring now to the drawings, wherein like reference numerals designate identical or corresponding parts throughout the several views, FIG. 1 shows a flow diagram of an analog discovery method and process.

Process 110 of method 100 performs a dynamic partitioning method.

Process 120 of method 100 performs a semantic boundary index method defining the SBIs.

Process 130 of method 100 performs an informational representation method.

Process 140 of method 100 performs a weighting representation method. In method 100, processes 130 and 140 are shown occurring in parallel. This indicates that there are no dependencies between processes 130 and 140 such that there is no predetermined order in which processes 130 and 140 are to be performed.

Process 150 of method 100 performs a signal interchange method.

Process 160 of method 100 performs an analogical discover method.

Process 170 of method 100 performs a first surprise and anomaly detection method.

Process 180 of method 100 performs a second surprise and anomaly detection method.

Process 190 of method 100 performs a dimensional stress discovery method.

Figure 2:
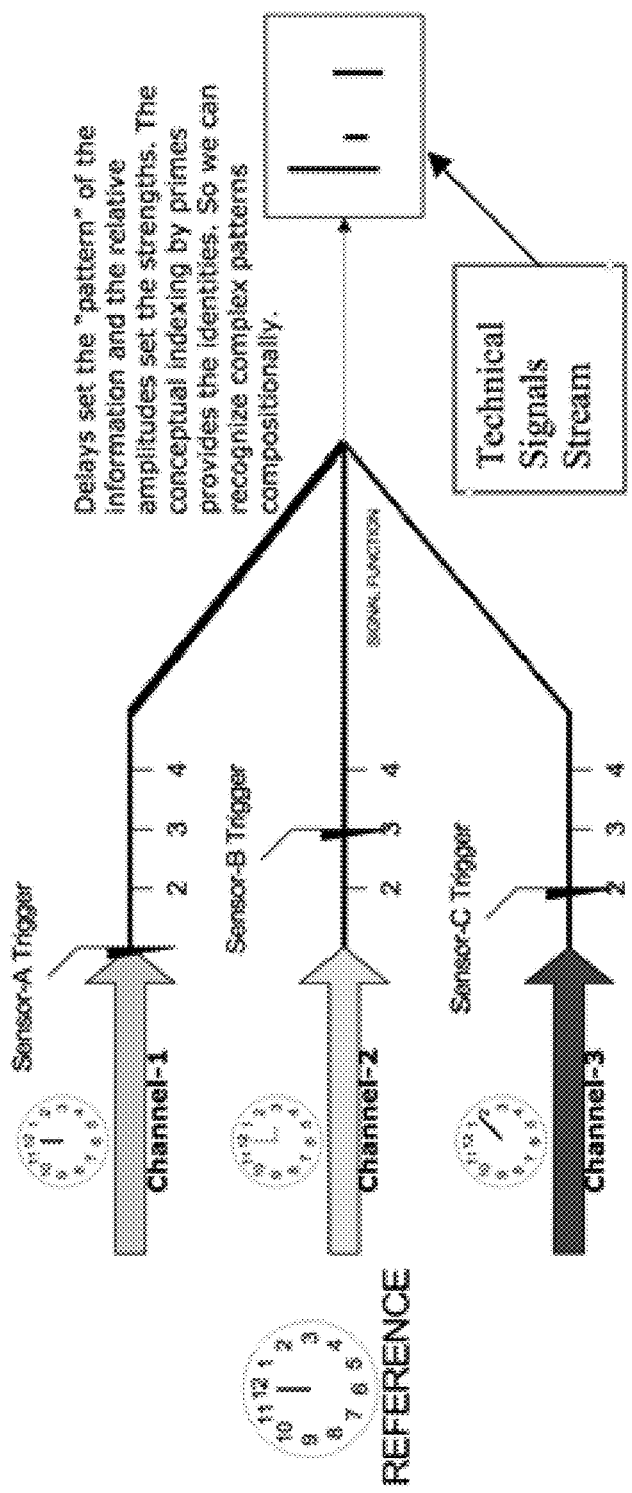
FIG. 2 shows a schematic diagram of an apparatus for generating a technical signal stream, according to one implementation.

FIG. 2 shows an example of a signal acquisition apparatus in which three channels have separate clocks, and different delays are set on each channel resulting in a series of offset spikes when the signal are combined to create a technical signal stream. The delays set the pattern of the information and the relative amplitudes set the strengths. The conceptual indexing by primes provides the identities. Accordingly, complex patterns can be recognized compositionally.

Figure 3:
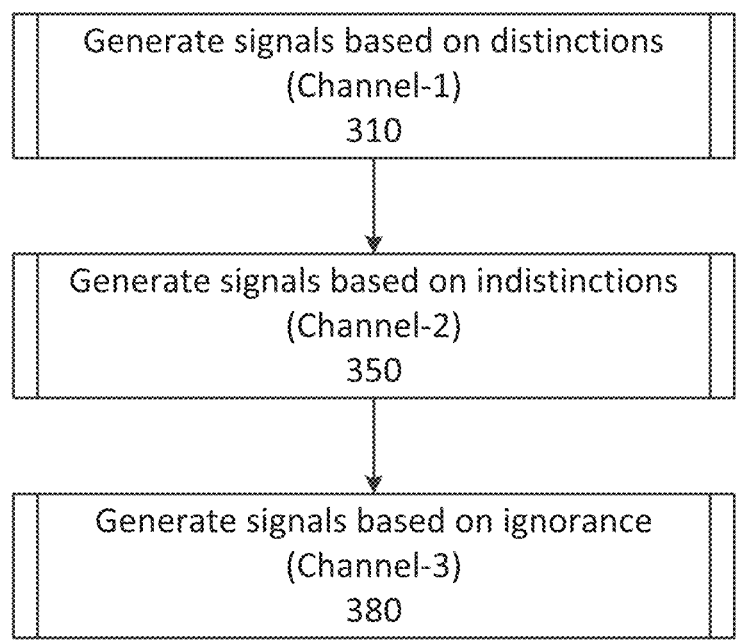
FIG. 3 shows a flow diagram of a dynamic partitioning process, according to one implementation.

FIG. 3 shows an implementation of the process 110 that performs a dynamic partitioning method.

Process 310 of process 110 determines a first channel corresponding to distinctions between the signals.

Process 350 of process 110, determines a second channel corresponding to indistinctions between the signals.

Process 380 of process 110, determines a first channel corresponding to ignorance between the signals.

Thus, the dynamic partitioning algorithm performed by process 110 is an algorithm that partitions data elements into categories called distinguishable, indistinguishable and ignorant.

A dynamic partioning process 110 allocates agents to generate signal measurements based on their observations, and, partitioning of signals into semantic components based on distinguishability according to the agent's private knowledge or, using the agent's private knowledge as a contrarian constraint, to split data along lines of "indistinguishability," noting that some data may fall into a third class that is neither distinguishable nor indistinguishable, in which case the data is labelled as "ignorant." Partitioning based on indistinguishability is a related to "Rough Sets" techniques. Further, partitioning based on distinctions is related to methods of data clustering. However the interaction between distinctions data and indistinctions data produces the "ignorant" data that can be used to develop the analogs or proxies. Dynamic partitioning uses a fundamental unity at the machine processing layer wherein the observation, evidence of existence, meaning, referants, encoding, categorization and retrieval mechanism of all signals is done consistently, systematically and completely. This is a core attribute of the semiotic-based signal processing at the base of the present disclosure. It is precisely the gaps between models for the distinctions and indistinctions that produces the signal levers in the form of data that can be iterated to identify analogs or proxies. This process is discussed farther below.

The process 310 determining the distinctions signals is defined by the steps of Algorithm 1:
  i) Obtain raw observations into some class using a measurement rubric. For example, stock market technical indicators or semantic distance measures, such as the Resnik measure, based on an existent ontology or database may be used;
  ii) Extract a random set of training patterns from the set, p;
  iii) Map the patterns into y: $\Re^m$ using a geometric non-linear mapping function, p→y. Any iterated function system can be utilized with an iteration limit as all iterated systems are essentially fractal and non-linear in behavior;
  iv) Determine an ontology for the patterns, o by clustering, for example using K-means clustering or other distance-measure based method;
  v) Create some reference patterns, r based on known data interpretations;
  vi) Determine a similarity function between p and r: sim(p,r) under o and call the set of similarities, s, for example using the Pearson Correlation Coefficient;
  vii) Determine a set of functions, $S(f_i)$, to map $s_i \rightarrow y_i$, for example, using Shepard Interpolation functions; and
  viii) Collect all functions of the $S(f_i)$, and export them as the information to knowledge mapping, IK. This set is called the Technical Signals Set.

Addition the distinctions signals channel can be updated for new patterns by the steps of Algorithm 2:
  i) Determining the similarity of any new pattern to each reference pattern;
  ii) Determine the function, $S(g_i)$, to map $s_i \rightarrow y_i$; and
  iii) Update the Signal containing $S(f_i)$ with $g_i$.

The process 350 determining the indistinctions signals is defined by the steps:
  i) Extract raw observations into some class set based on failure to distinguish by process 310;
  ii) Extract a random set of training patterns from the set, p;
  iii) Map the patterns into y: $\Re^m$ using a geometric non-linear mapping function, p→y;
  iv) Determine an ontology for the patterns, o;
  v) Create some reference patterns, r;
  vi) Determine a similarity function between p and r: sim(p,r) under o and call the set of dissimilarities, s;
  vii) Determine a set of functions, $S(f_i)$, to map $s_i \rightarrow y_i$ under o;
  viii) Chain or cluster the objects $y_i$ using a conceptual distance metric and basis, C, and create the set of clusters, $\{y_{ci}\}$ that clustered by their indistinguishability with respect to a chosen basis reference;
  ix) For each disjoint cluster, $c_i$ in C of $y_i$, determine the "closest" training reference set based on the distance between $r_i \rightarrow y_i$ to the cluster prototypes, $c_i$;
  x) Find |ci| independent functions that determine the indistinct membership (i.e. the rough set) of the functions $S(f_i)$ to each $c_i$ in C, call this set, $S(h_i)$;
  xi) For each $S(h_i)$, determine the mapping to $S(f_i)$ and call this $M_i$; and
  xii) $M_i$ is the indistinct technical signals.

The algorithm for the generation of technical signals that is used to create the analogs is described, therefore, as the interaction between an algorithm to generate signals using distinctions and a second algorithm that generates partitions of data based on indistinctions. For convenience the three kinds of signals for distinctions, indistictions and ignorance are labeled as type-1 Channels (aka Channel-1) data, Channel-2 and Channel-3 respectively.

Figure 4:
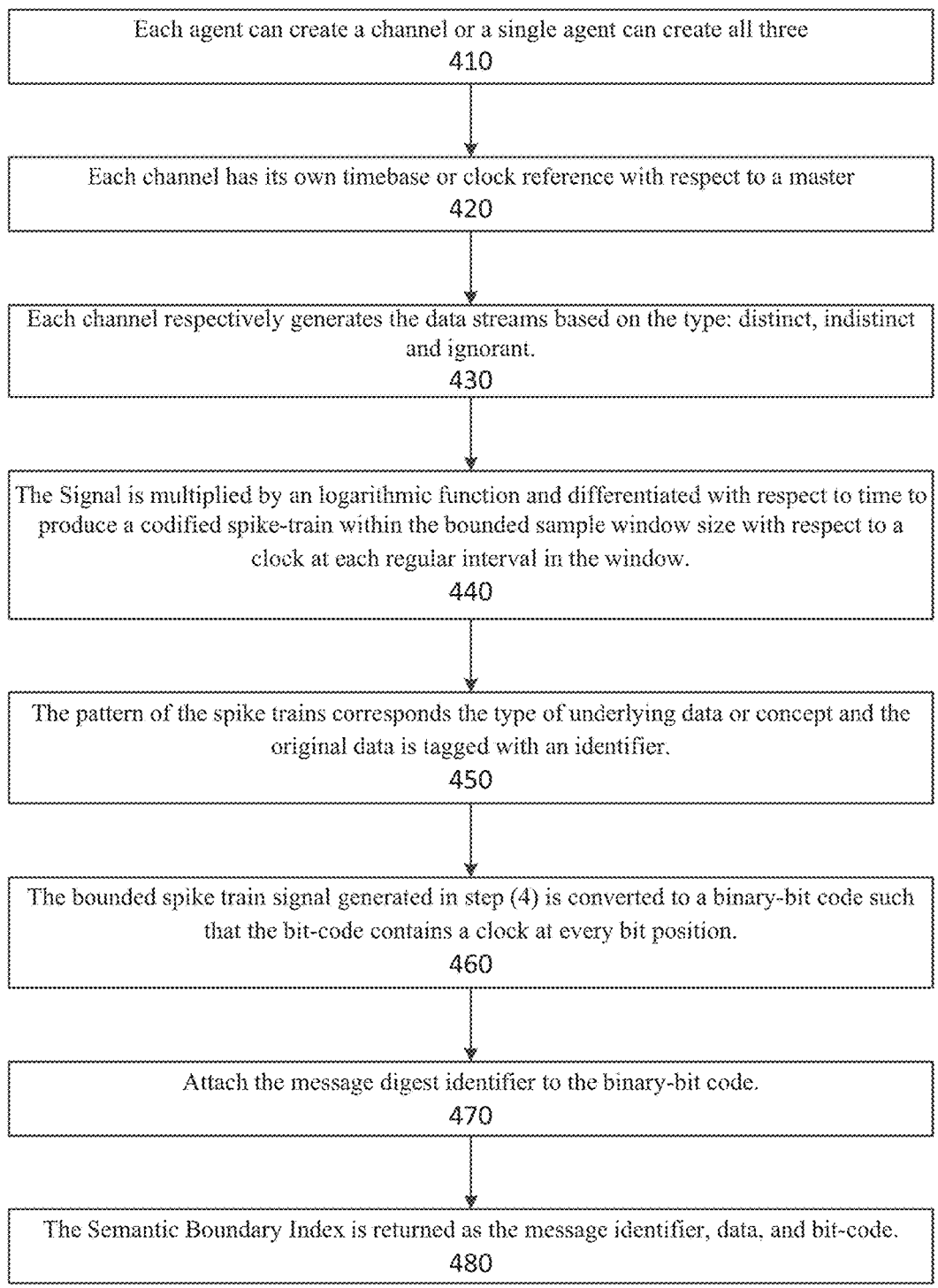
FIG. 4 shows a flow diagram of a semantic boundary index process, according to one implementation.

The Process 380 to determine the ignorance signal identifies those signal not in the first or second channel as being in the third channel (i.e., the ignorant signals). Referring to the Algorithm-1 and Algorithm-2 above: Identify the complement of the union of the histogram of the set of signals with respect to data within the given bounding window (i.e. sample size) and call this set the "ignorant signal" set. This set represents data that produces anomalies or is related via implicit relationships not directly observable by the methods provided Referring now to FIG. 4, the process 120 performs the semantic boundary index algorithm. The Semantic Boundary Index Algorithm is a method to encapsulate the three distinctions in a single stream based software data representation object suitable for computing various other properties of the underlying data that may not be directly measurable.

In step 410 of process 120, each agent can create a channel or a single agent can create all three.

In step 420 of process 120, each channel has its own timebase or clock reference with respect to a master wherein the clock can be a Logical Lamport clock.

In step 430 of process 120, each channel respectively generates the data streams based on the type: distinct, indistinct and ignorant. The data stream is sampled at a rate with respect to the clock and for a specific number of samples. The size of the sample window and the rate of sampling is called the "boundary."

In step 440 of process 120, the Signal is multiplied by an logarithmic function and differentiated with respect to time to produce a codified spike-train within the bounded sample window size with respect to a clock at each regular interval in the window.

In step 450 of process 120, the pattern of the spike trains corresponds the type of underlying data or concept and the original data is tagged with a uniquely generated MD5 (message digest) identifier.

In step 460 of process 120, the bounded spike train signal generated in step (4) is converted to a binary-bit code such that the bit-code contains a clock at every bit position. So for 64 clock-ticks, there will be a 64-bit binary bit-code.

In step 470 of process 120, the output of step 460 is attached with the message digest identifier.

In step 480 of process 120, the Semantic Boundary Index (SBI) is returned as the message identifier, data, and bit-code.

Figure 5:
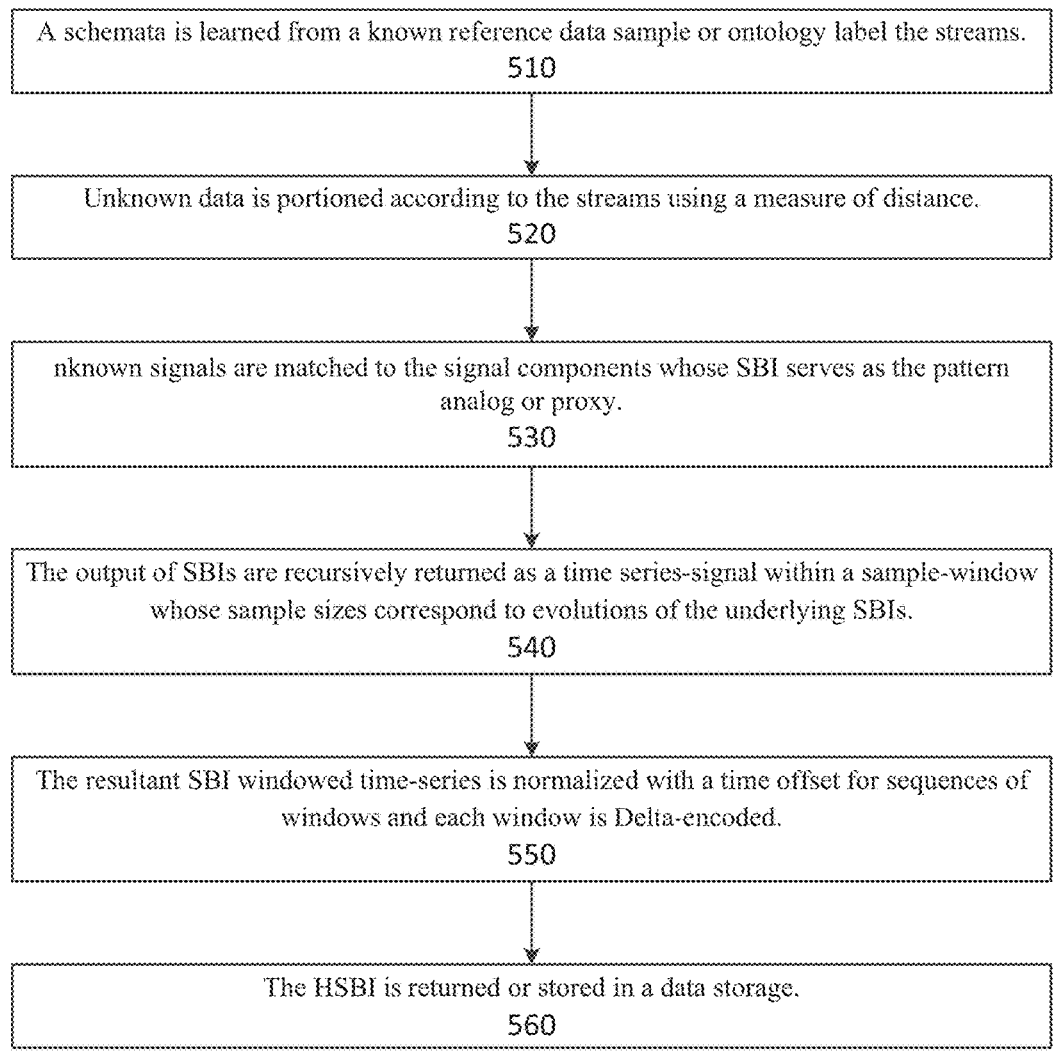
FIG. 5 shows a flow diagram of an information representation process, according to one implementation.

Referring now to FIG. 5, the process 130 performs the informational representation algorithm.

In step 510 of process 130, a schemata is learned from a known reference data sample or ontology label the streams. The reference data will have a meta-data tag that is assigned and that this tag will be used to tag the SBI derived from process 120.

In step 520 of process 130, unknown data is portioned according to the streams using a measure of distance, such as a Dice measure, a Jaccard measure or any other measurement.

In step 530 of process 130, unknown signals are matched to the signal components whose SBI serves as the pattern analog or proxy for classifying unknown patterns based on a threshold that is chosen with respect to the system of measurement that is chosen.

In step 540 of process 130, the output of SBIs are returned as a time series-signal within a sample-window whose sample sizes correspond to evolutions of the underlying SBIs themselves and this process can be recursive to any user-chosen depth.

In step 550 of process 130, the resultant SBI windowed time-series is normalized on a scale of 0 to 1 with a time offset for sequences of windows and each window is Delta-encoded (i.e. difference encoded) and returned as a Hierarchical Semantic Boundary Index (HSBI). For example, for periodic patterns, the HSBI will repeat within a certain number of samples and form a fixpoint.

In step 560 of process 130, The HSBI is returned or stored in a data storage.

The choice of functions (by which data is transduced into channels) impacts the quality of the resulting signals measures. Selection of data points for the functions could be based on maximum entropy (or diversity), and has a beneficial effect over random selection as it eliminates redundancy in the representation of the input data. However, other methods may also be used to generate an SBI provided that distinguishability, indistinguishability, and ignorance are represented In contrast with the algorithm and method of Semantic Boundary Indices, Vector space methods and algorithms have the following problems.

1) Euclidean normalization is used, which is not a trivial calculation for real neural hardware.
2) The size of input components Ik and their importance is confounded. If a weak component has particular importance, or a strong one is not reliable, there is no way to represent this. A single W measure can describe only one semantic dimension of the target components.
3) There is no natural composition if the problem is to be broken into a hierarchy by breaking the inputs into several parts, solving independently, and feeding these results on to a higher level processor for a final recognition. This is best seen by analogy to vision. If a person recognizes in a picture grandmother's nose at one scale, her mouth at another, and her right eye at a third scale, then it is assuredly not grandmother. Separate normalization is a difficult for creating hierarchies (it flattens out all semantics).
4) A substantial number of inputs may be missing or giving grossly wrong information. The "dot-product-and-threshold" solution cannot contend with this problem since the semantic differentiation is lost.

All four of the above-identified problems are removed when the information is encoded and computed using the dynamic-partitioning to generate signals measurements on the data. The three data feed channels to the signal representation occurs by the position of signals with respect to a reference time Temporal Signature, T (possibly a logical clock). The interval between T and the time of a "spike" in a channel is scaled logarithmically and so we may say that time of the spike is j and with input channel, I, therefore is defined by log Ij. Further, signals may be weighted in accord with other information (statistical or belief or probabilistic or evidential using Dempster-Shafer theory for example).

Thus a behavioral pattern can be recognized on the basis of its "relative" components from the technical signal measurement window. Scale information is retained in the time at which the recognition unit is driven. The system clearly "composes", and difficulty (3) is surmounted. No normalization is required, eliminating difficulty (1). Each channel has three parameters describing it, a delay (which contains the information about the pattern to be recognized) and a signal strength (which describes the weight of the at the recognition unit) as well as the shape (which expresses the concepts being computed on).

Therefore, scale and importance (weight or confidence measures) are separately represented whereas in traditional systems they are flattened out. The central computational motif is to use the Technical Signal measures and their associated semantic components because these capture the relativity, association and implicit correlations between data and information, and, succinctly, the relative timing represents information and time delays to represent informational dynamics patterns (Temporal evolution or behavior within the information about the data itself embedded).

The present method for dynamic partitioning can tolerate errors due to missing or grossly inaccurate information computing within the time-domain information mapping with those of a conventional method, for example, using a traditional neural network model or LSA/LSI. The reason is that when the learning thresholds are set high, both schemes recognize the same information (i.e. a high threshold means that there is high clarity in the received information and it is not ambiguous).

In a situation of high noise or competitive signals, lowering the recognition threshold in the time-domain scheme results in determining whether any two components are in the correct ratio, independent of the size of the third component. The decoupling of scale from importance permits this to be discerned with the conventional method. This type of threshold lowering means that almost any vector (of the incoming information) would be recognized (falsely) because scale is mixed up with relative importance.

Each channel may undergo different levels of distortion, noise and relative time-warping that, as long as it exists without destroying entirely the relative timing between the sensor data, will provide a model for accurate, noise-immune data to information transformation.

Regarding semantic boundary layers in HSBI, when signals are processed in a hierarchy where aggregated combinations of signals are reduced to the triple set that forms a new Hierarchical Semantic Boundary Index (HSBI) output (i.e. that inputs are objects and representamens and outputs are interpretants). The boundary layers correspond to the layers between hierarchies and within these layers, the clusters of aggregation and the choice of sampling windows that delineates the boundary conditions of the aggregates that correspond to the new interpretants.

Regarding SBIs, the semantic boundary indices correspond to the difference measure between successive interpretants.

Regarding dimensional stress measures, dimensional stress correspond to distortions, dilations and contractions of the interpretants.

The Semantic Boundary Index Algorithm and its recursive Hierarchical Semantic Boundary Index produces an index structure whose contribution under varying environmental factors will change with respect to the contribution it makes to the representation of analogs: in other words, to make use of the present invention, the SBI is tagged with a meta-data tag and the similarities or clusters of SBI with different, non-matching tags, is interpreted to mean that the tags are analogs of each other. Boundaries between clusters of SBIs form layers that may be shared between overlapping clusters and hence analogs may share direct similarities, or, with various weightings, the boundaries may enlarge or contract. In the extreme cases, a boundary layer from one SBI may consume a neighboring SBI. In this extreme case, the consumer becomes the new classifier of that data and its underlying SBI in the sense that one analog subsumes another. In this way, sequential hierarchies of subsuming or enclosing SBIs may be structured as images of weightings. This change is quantified through the use of a weighting scheme for the algorithm is presented for the present invention.

Process 140 applies these weights to the SBIs. The weights can be derived by subject matter experts confidence measures, through statistical, or possibilistic or empirical methods and may be also assigned by a training process in which weights are adjusted until the analogs align with human validated judgments.

Process 150 performs the signal interchange algorithm. The signal interchange algorithm provides a means to convert one representation from one channel to another and permits agents using the SBIs to interoperate. For example, an interchange can occur between three signal types, such that a Signal-A, encapsulates Signals B and C. Another example of signal interchange can be where Signal-A is merged to Signal-D.

Figure 6:
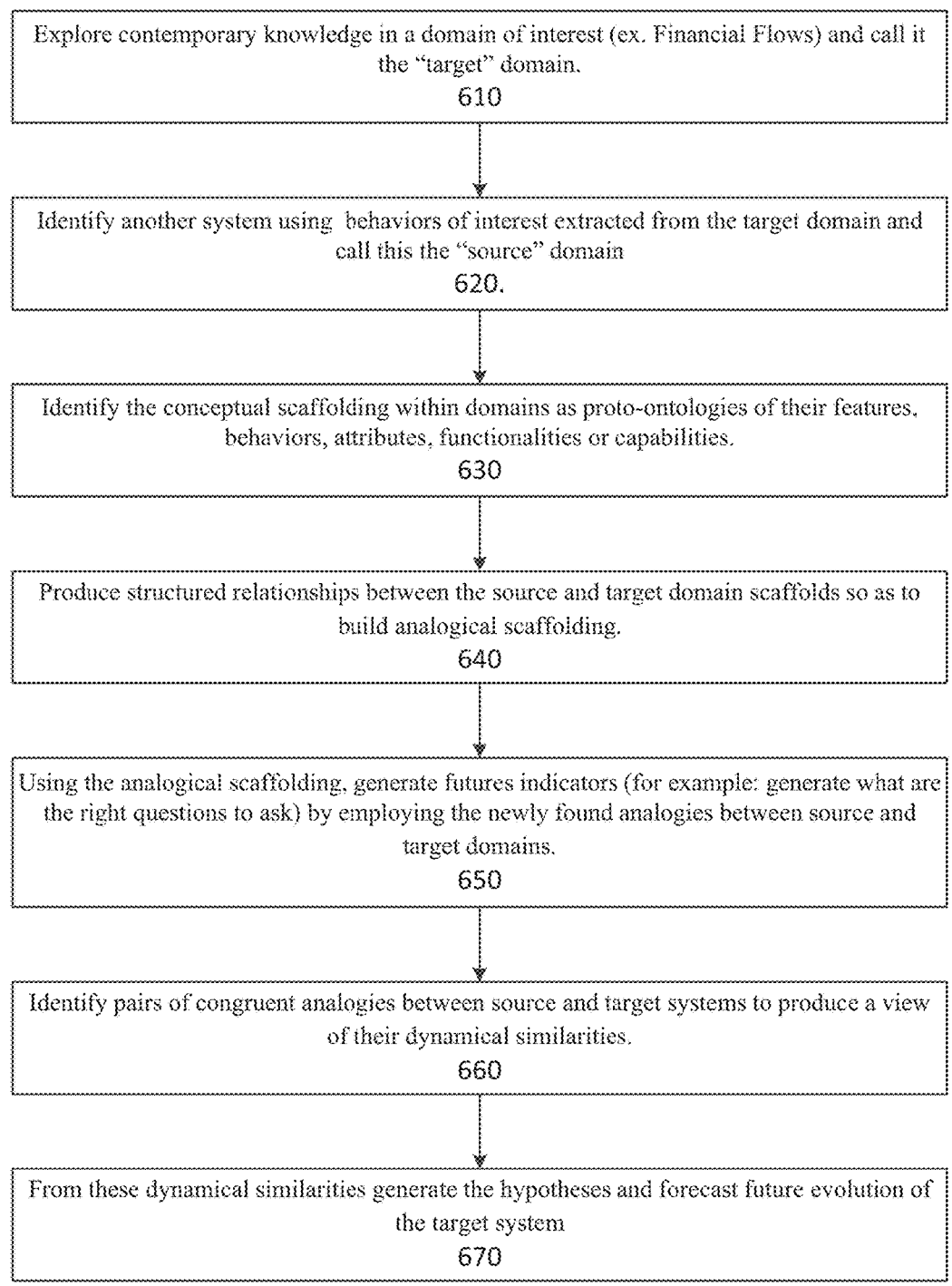
FIG. 6 shows a flow diagram of a process to perform analogic discovery, according to one implementation.

Referring now to FIG. 6, the process 160 performs the analogic discovery algorithm. The set of measures and their associations to the underlying data-driven features produces a representation that can be used to relate the concrete data structures as analogs to each other by correlation through their SBIs. Process 160 applies the use of an analogy engine, such as the VivoMind Analogy Engine (VAE) to forecasting and prediction of non-obvious futures in the application process as defined here and using the SBI's to identify the prospective analogs that may be used to provide the analogy engine with sufficient parts to synthesize a whole and complete analogy.

In step 610 of process 160, the analogy engine contemporary knowledge in a domain of interest (e.g., Financial Flows) is explored, and this domain is designated as the "target" domain.

In step 620 of process 160, another system (e.g., biological processes) is identified using behaviors of interest extracted from the target domain and call this the "source" domain.

In step 630 of process 160, the conceptual scaffolding within domains are identified as proto-ontologies of their features, behaviors, attributes, functionalities or capabilities.

In step 640 of process 160, (iv) structured relationships are produced between the source and target domain scaffolds so as to build analogical scaffolding.

In step 650 of process 160, (v) Using the analogical scaffolding, futures indicators are generated (e.g., generate what are the right questions to ask) by employing the newly found analogies between source and target domains.

In step 660 of process 160, pairs of congruent analogies are identified between source and target systems to produce a view of their dynamical similarities.

In step 670 of process 160, from these dynamical similarities the hypotheses are generated and future evolution of the target system is forecast.

Many potential systems exist for the source domain. Some models are listed herein, but his list of potential models of the source domain is not limiting. The models for analogy can include:

1. Information Models from Science And Technology journals;
2. Signal data models from Biology, Politics, Stock Markets, and other sources;
3. Measurement models (applicable to signal data) from Informatics Journals or sources;
4. Processing models (computer instrumentation of signal data models) from business process or factory shop scheduling models;
5. Analysis Models as they occur in business intelligence, scientific or technical intelligence practices;
6. Qualitative assessment models: such as the outputs of the Analytic Hierarchy Process (AHP);
7. Quantitative assessment models: such as the weighting outputs from the AHP;
8. Gap analysis models as understood in scientific, technical or social requirements engineering;
9. "Level of Development" models such as the NASA Technology Readiness Assessment Level models;
10. Analogical reasoning models: such as the Analogy Ontology of Veale et al. or of Falkenheimer et al.;
11. Precondition mapping models: such as the TRIZ method mapping models for design;
12. Surprise Models as per the present invention;

13. Projection models as per portfolio and stock market analysis models;
14. Analogy of Analogies models: such as metaphors, allegories, similes and other discursive structures that are analogical as training sets to the present invention; and
15. Other ontologically based models as may used or identified from time to time.

A significant advantage of the analogical discovery process contained in the current disclosure is that it enables rapid repurposing of past experience to achieve operational innovation in novel or unforeseen circumstances. Analogical reasoning through a signals processing paradigm allows one to discover the hidden knowledge that is implicit in and between domains. The analogy discovery process permits users to relate apparently incommensurate and separate domains as structured relationships, and in so doing to craft results and craft that together produce a new view and understanding of the meaning of large, unstructured data fields.

Process 170 performs the first surprise and anomaly detection process. The use of moving averages as well as momentum and periodicity detection processes, such as used in traditional portfolio analyses are combined to produce indications of critical points of dimensional stress where major shifts may occur. These regions of high instability form the nexus for surprising outcomes or anomalies, and the characteristics bear a resemblance to the types of evolutive structural processes found in chaotic systems, which can produce surprises and anomalies.

In addition to the moving averages, momentum, and periodicity detection processes discussed above, traditional portfolio analyses use many other technical indicators. Here, several technical indicator are listed from Steven B. Achelis, *Technical Analysis from A to Z*, McGraw-Hill, (2000), incorporated herein by reference in its entirety. These indicator include:

1. Absolute Breadth Index
2. Accumulation Distribution
3. Accumulation Swing Index
4. A/D Line
5. A/D Ratio
6. Advancing—Declining Issues
7. Arms Index
8. Aroon
9. Average True Range
10. Bollinger Bands
11. Breadth Thrust
12. Bull|Bear Ratio
13. Chaikin Money Flow
14. Chaikin Oscillator
15. Chande Momentum Oscillator
16. Commodity Channel Index
17. Commodity Selection Index
18. Correlation
19. Cumulative Volume Index
20. DEMA and TEMA
21. Detrended Price Oscillator
22. Directional Movement Indicators
23. Dynamic Momentum Index
24. Ease of Movement
25. Envelopes
26. Forecast Oscillator
27. Inertia
28. Intraday Momentum Index
29. Klinger Oscillator
30. Large Block Ratio
31. Linear Regression Indicator
32. Linear Regression Trendline
33. Linear Regression Slope
34. MACD
35. Market Facilitation Index
36. Mass Index
37. McClellan Oscillator
38. McClellan Summation
39. Median Price
40. Member Short Ratio
41. Momentum
42. Money Flow Index
43. Moving Average—Exponential
44. Moving Average—Simple
45. Moving Average—Time Series
46. Moving Average—Triangular
47. Moving Average—Variable
48. Moving Average—Volume Adjusted
49. Moving Average—Weighted
50. Negative Volume Index
51. New Highs—Lows Cumulative
52. New Highs—New Lows
53. New Highs|New Lows Ratio
54. Odd Lot Balance Index
55. Odd Lot Short Ratio
56. On Balance Volume
57. Open-10 TRIN
58. Overbought|Oversold
59. Parabolic SAR
60. Performance
61. Positive Volume Index
62. Price Channels
63. Price Oscillator
64. Price ROC
65. Price and Volume Trend
66. Projection Bands
67. Projection Oscillator
68. Public Short Ratio
69. Puts|Calls Ratio
70. QStick
71. r-squared
72. Raff Regression Channel
73. Range Indicator
74. Relative Momentum Index
75. Relative Strength, Comparative
76. Relative Strength Index
77. Relative Voltlty Idx & Inertia
78. Standard Deviation
79. Standard Deviation Channel
80. Standard Error
81. Standard Error Bands
82. Standard Error Channel
83. STIX
84. Stochastic Momentum Index
85. Stochastic Oscillator
86. Swing Index
87. TEMA
88. Time Series Forecast
89. Total Short Ratio
90. TRIX
91. Typical Price
92. Ultimate Oscillator
93. Upside|Downside Ratio
94. Upside—Downside Volume
95. Vertical Horizontal Filter
96. Volatility, Chaikin's
97. Volume Oscillator 98. Volume Rate of Change
99. Weighted Close
100. Wilder's Smoothing
101. Williams Acc-Dist
102. Williams' % R Analogs rely on data streams from low-level data filters that produce votes on meta-data tags that that serve as symbolic observations of signals that signify the presence risk within the operating system environment.

The EMA is a comparison of the percentage of the current voting frequency supporting a tag to a percentage of yesterday's moving average value. Exponential moving averages place more weight on recent votes to support tags. The advantage the Exponential Moving Average (EMA) indicator has over simple moving averages is that recent votes dominate earlier votes. This makes the EMA highly responsive to short-term trends so that anomalies in short-term trends (such as short term initial application behaviors) can reveal the possibility of a threat-agent. A length parameter, k, controls how responsive to recent trends the EMA is. At time i, the k time EMA where $\rho_t$ is the value at time t and $EMA_{t-1}$ is the previous time's EMA with size (length) κ.

$$EMA_t = EMA_{t-1} + \left(\frac{2}{\kappa+1}\right)(\rho_t - EMA_{t-1})$$

An agent can compare when the short term EMA crosses above a longer term EMA for a given set of votes (tagged votes about an observation produced by the low level data filter). This kind of crossover indicates increased confidence that the indicator is identifying a specific strength of the performance of a specific tag (signaling either "stress" or "relaxation") to be voted upon by the rest of the active agent population.

In order to compare SBI from different quality dimensions, initially we will normalize all SBIs within the interval of [−1,1], and we use the weighting algorithm for biasing importance of quality dimensions. Each inference rule, such as the EMA cross-over rule, will be devised for the other indicators by adapting like rules from the trading domain of modern portfolio theory.

Referring now to FIG. 7, the process 180 performs the second surprise and anomaly detection method. The specific and preferred formulae for use in enacting the representational processes are listed and variants are given that provide specificity to the outcomes in the present invention.

A simple moving average is formed by computing the average value of an SBI over a specific number of windows: this itself produces a Hierarchical SBI. Training sets of "surprising and anomalous" patterns are generalized by characterizing the dynamics and especially the change in dynamics with respect to the norm of the dynamics, by computing, skewness, kurtosis, deviation and other higher-order factors of the SBI.

In step 710 of process 180, the SBIs of each source is built using a training set of surprises from correlated sources, such as science-fiction literature as one source and patent-literature as another source.

In step 720 of process 180, the similarities between SBIs is computed using a distance matrix or k-means clustering or other algorithms.

In step 730 of process 180, For each of the tagged data, compute the image of the SBI is computed using appropriately chooses Stock Market Technical indicators representing: volume, cycles, momentum and rates of change.

In step 740 of process 180, the skewness, kurtosis, deviation and exponential moving averages are computed.

In step 750 of process 180, the data tagged as "surprise" is compared to the data tagged otherwise and use 50% of the difference in values between the step 740 of results to compute a "threshold."

In step 760 of process 180, the method is applied to new data and for any date exceeding the threshold, mark the data for "surprise."

In step 770 of process 180, the "surprise" data structure SBIs are returned.

Referring now to FIG. 8, the process 190 performs the dimensional stress method. The key factors include a multi-dimensional set of data and informational elements that modulate the Semantic Boundary Index. These elements include Dimensional Stressors, Relaxors, Inhibitors and Accelerators. Qualitative and quantitative assessment models integrated with the Information Models in the present disclosure are deployed to analyze content in large unstructured data. Such Analysis Models include, but are not limited to, gap analysis models, intelligence tradecraft models, domain models, Technology Readiness Level models, Manufacturing Readiness Level models, analogy reasoning models, projection and forecasting models, threat matrix models, SWOT models and other analysis methods.

In step 810 of process 180, pairs of correlated sources are formed from a training set of surprises. For example, the pairs of correlated sources can be formed using science-fiction literature as one source and patent-literature as source pair, and a pair from New Reports and Political Events, build the Algorithm for Anomaly and Surprise for each pair.

In step 820 of process 180, the skewness, kurtosis, deviation and exponential moving averages are computed between the differences in the pairs;

In step 830 of process 180, a weighting is applied to the difference until it causes a 50% shift in the thresholds for the Algorithm for Anomaly and Surprise. This is a Dimensional Stress Index.

In step 840 of process 180, the method is applied, with respect to the sampling window boundary, to new data and for any data:
1. increasing the threshold, mark it as stressor;
2. reducing the threshold mark it as a relaxor;
3. dilating the position of the threshold mark it as a retardant; and
4. Contracting the position of the threshold, mark it as an accelerant.

In step 810 of process 180, process 180 returns the Dimensional Stress Indexes.

Certain signal patterns associated with certain semantic boundary layers are associated by this disclosure with a core semantic element called "Dimensional Stress." Dimensional Stress is a semantic category of information or model that describes the preconditions occurring with fast-moving, unexpected changes in the meaning of information contained in large unstructured data due to the introduction of new data or knowledge, or the removal of data or knowledge from the data field. Dimensional Stress is a semantic measure by which to generate awareness ahead of time regarding conditions in the unstructured data field that suggest the existence or emergence of certain types of semantic boundary layers. These semantic boundary layers have in turn been assessed by the present disclosure to be closely associated with semantic boundary index scores that are associated with Dimensional Stress and Dimensional Stressors, thus permitting the analyst to build structured knowledge repositories about when stable, unstable, unchanging or rapidly changing semantic elements may be occurring, or may start to occur. This knowledge base produces future awareness regarding the element of surprise in large unstructured data fields. Dimensional stress is a core semantic attribute associated with the discovery of potential, rapid, unexpected changes in the meaning of content in large, continuously updated unstructured data fields, including a core semantic attribute for the discovery of analogies.

The Dimensional Stress Index is generated through real-time measurement and processing of signals regarding Semantic Boundary Layers and Semantic Boundary Interaction Indexes. High dimensional stress occurs when there is high variance (instability over time) within and between specific semantic boundary layers, associated with key drivers in domain. Low dimensional stress occurs when there is low variance (stability over time) within and between specific semantic boundary layers, associated with key drivers in domain. The Dimensional Stress Index in both cases is produced as a result of quantified signal data model tuned to detect variance over time, stability and instability within and between the semantic boundaries.

Surprise models are based on the interaction between the quantified SBIs time series measurements with respect to pairs of analogs from related literature sets as inputs for a given domain. Domains for literature sets can include certain preferred embodiment pairs such as:
 1. Political News and Political Events (ex. statements by a head of state and votes caste by voters)
 2. Science Technical Journals and Patent Literature
 3. Patent Literature and Science-Fiction Literature
 4. Economic News and Natural Events (for example, stock prices and Tsunamis)
 5. Military Events and Social News (for example, mobilization and rates of mental illness or rates and scales of demonstrations)

Surprise Models are "models of models" in that they are generated from analytical work in specific contexts between the interactions of SBIs and their respective analogs from pairs of models: the results of signals processing over the boundaries and using the present methods and algorithms generate analogies, analogies of analogies, models of gaps in unstructured data-fields, models of dimensional stress and dimensional stressors, models of semantic boundary layers and other models of core semantic elements. Surprise Models are a central outcome of analogical reasoning.

The "surprise" SBIs returned are used to identify analogs, and the analogs are used with the Analogy Discovery process to identify unforeseen surprises or anomalies.

Each of the algorithms and processes described above and features of the invention can be implemented using some form of computer processor or processing circuitry, for example, using particularly programmed processing circuitry. The circuitry may be particularly designed or programmed to implement the above described functions and features which improve the processing of the circuitry and allow data to be processed in ways not possible by a human or even a general purpose computer lacking the features of the present embodiments. As one of ordinary skill in the art would recognize, the computer processor can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the computer processor may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OSX and other operating systems known to those skilled in the art.

In addition, the invention can be implemented using a computer based system 901. Each of the functions of the above described embodiments may be implemented by one or more processing circuits. A processing circuit includes a programmed processor (for example, processor 903 in FIG. 9), as a processor includes circuitry. A processing circuit also includes devices such as an application-specific integrated circuit (ASIC) and conventional circuit components arranged to perform the recited functions.

Figure 9:
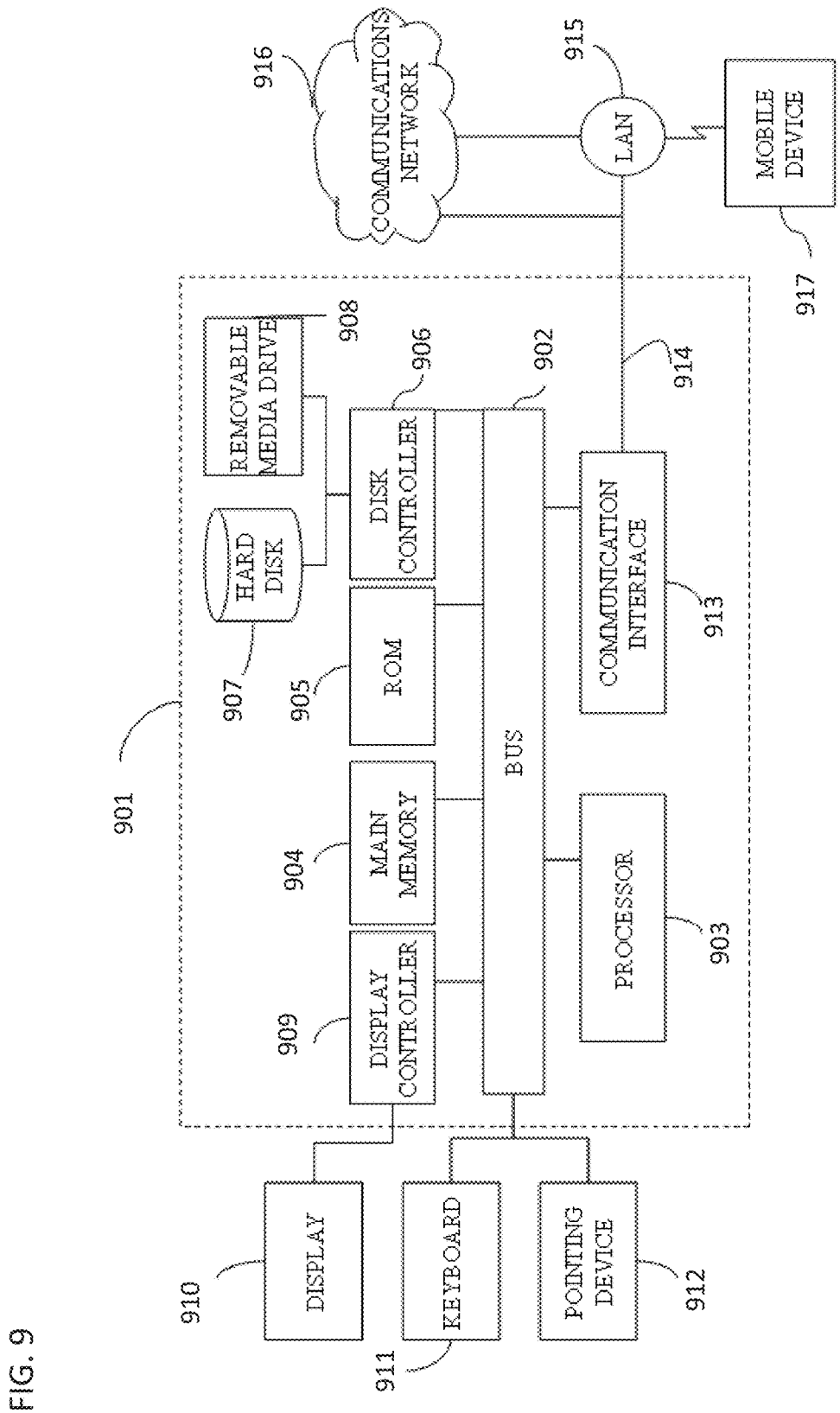
FIG. 9 shows a block diagram of a computing device, according to one implementation.

The various features discussed above may be implemented by a computing device such as a computer system (or programmable logic). FIG. 9 illustrates such a computer system 901. The computer system 901 of FIG. 9 may be a particular, special-purpose machine. In one embodiment, the computer system 901 is a particular, special-purpose machine when the processor 903 is programmed to compute vector contractions.

The computer system 901 includes a disk controller 906 coupled to the bus 902 to control one or more storage devices for storing information and instructions, such as a magnetic hard disk 907, and a removable media drive 908 (e.g., floppy disk drive, read-only compact disc drive, read/write compact disc drive, compact disc jukebox, tape drive, and removable magneto-optical drive). The storage devices may be added to the computer system 801 using an appropriate device interface (e.g., small computer system interface (SCSI), integrated device electronics (IDE), enhanced-IDE (E-IDE), direct memory access (DMA), or ultra-DMA).

The computer system 901 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 901 may also include a display controller 909 coupled to the bus 902 to control a display 910, for displaying information to a computer user. The computer system includes input devices, such as a keyboard 911 and a pointing device 912, for interacting with a computer user and providing information to the processor 903. The pointing device 912, for example, may be a mouse, a trackball, a finger for a touch screen sensor, or a pointing stick for communicating direction information and command selections to the processor 903 and for controlling cursor movement on the display 910.

The processor 903 executes one or more sequences of one or more instructions contained in a memory, such as the main memory 904. Such instructions may be read into the main memory 904 from another computer readable medium, such as a hard disk 907 or a removable media drive 908. One or more processors in a multi-processing arrangement may also be employed to execute the sequences of instructions contained in main memory 904. In alternative embodiments, hard-wired circuitry may be used in place of or in combination with software instructions. Thus, embodiments are not limited to any specific combination of hardware circuitry and software.

As stated above, the computer system 901 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes. Stored on any one or on a combination of computer readable media, the present disclosure includes software for controlling the computer system 901, for driving a device or devices for implementing the invention, and for enabling the computer system 901 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 903 for execution. A computer readable medium may take many forms, including but not limited to, non-volatile media or volatile media. Non-volatile media includes, for example, optical, magnetic disks, and magneto-optical disks, such as the hard disk 907 or the removable media drive 908. Volatile media includes dynamic memory, such as the main memory 904. Transmission media, on the contrary, includes coaxial cables, copper wire and fiber optics, including the wires that make up the bus 902. Transmission media also may also take the form of acoustic or light waves, such as those generated during radio wave and infrared data communications.

Various forms of computer readable media may be involved in carrying out one or more sequences of one or more instructions to processor 903 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 901 may receive the data on the telephone line and place the data on the bus 902. The bus 902 carries the data to the main memory 904, from which the processor 903 retrieves and executes the instructions. The instructions received by the main memory 904 may optionally be stored on storage device 907 or 908 either before or after execution by processor 903.

The computer system 901 also includes a communication interface 913 coupled to the bus 902. The communication interface 913 provides a two-way data communication coupling to a network link 914 that is connected to, for example, a local area network (LAN) 915, or to another communications network 916 such as the Internet. For example, the communication interface 913 may be a network interface card to attach to any packet switched LAN. As another example, the communication interface 913 may be an integrated services digital network (ISDN) card. Wireless links may also be implemented. In any such implementation, the communication interface 913 sends and receives electrical, electromagnetic or optical signals that carry digital data streams representing various types of information.

The network link 914 typically provides data communication through one or more networks to other data devices. For example, the network link 914 may provide a connection to another computer through a local network 915 (e.g., a LAN) or through equipment operated by a service provider, which provides communication services through a communications network 916. The local network 914 and the communications network 916 use, for example, electrical, electromagnetic, or optical signals that carry digital data streams, and the associated physical layer (e.g., CAT 5 cable, coaxial cable, optical fiber, etc.). The signals through the various networks and the signals on the network link 914 and through the communication interface 913, which carry the digital data to and from the computer system 901 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 901 can transmit and receive data, including program code, through the network(s) 915 and 916, the network link 914 and the communication interface 913. Moreover, the network link 914 may provide a connection through a LAN 915 to a mobile device 917 such as a personal digital assistant (PDA) laptop computer, or cellular telephone.

The present embodiments have many applications including but not limited to searching and identifying patterns in data.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. A method of data mining to generate a technical and/or semantic signal interpretation that is generated from a raw data stream of unstructured data using automated-agent circuitry, the method comprising:
    obtaining raw data from a raw data stream;
    operating on the raw data according to a measurement rubric to generate measurements;
    determining a first set of signal indicators based on a distinguishability metric representing a distinguishability among the generated measurements of the raw data;
    determining a second set of signal indicators based on an indistinguishability metric representing an indistinguishability among the generated measurements of the raw data;
    determining a third set of signal indicators based on an ignorance metric representing ignorance of the distinguishability and of the indistinguishability of the generated measurements of the raw data, the third set of signal indicators comprising signal indicators representing a complement of a union between signal indicators of the first set of signal indicators and of the second set of signal indicators;
    discerning distinguishability indicators in the raw data stream by applying the first set of signal indicators to the raw data stream to generate one or more distinguishability data streams;
    discerning indistinguishability indicators in the raw data stream by applying the second set of signal indicators to the raw data stream to generate one or more indistinguishability data streams;
    discerning ignorance indicators in the raw data stream by applying the third set of signal indicators to the raw data stream to generate one or more ignorance data streams;
    combining the one or more distinguishability data streams, one or more indistinguishability data streams, and one or more ignorance data streams to generate one or more semantic-boundary indices; and
    outputting one or more technical and/or semantic interpretations of the raw data stream or one or more technical and/or semantic determinations of the raw data stream using the one or more semantic-boundary indices.

2. The method according to claim 1, wherein the operating on the raw data according to the measurement rubric further includes that the measurement rubric is one of a technical indicator of a financial or commodity security, a semantic distance measure, and a Resnik measure.

3. The method according to claim 1, wherein the determining of the first set of signal indicators is performed by
    determining a set of patterns from the measurements, to generate training data,
    mapping the training data from a raw-data space onto a target space, and the target space is a multi-dimensional vector space,
    determining, using clustering, an ontology of the training data corresponding to the set of patterns from the measurements,
    receiving reference patterns based on interpretations of the raw data,
    determining similarity measures between the set of patterns of the training data and the reference patterns,
    estimating a first set of mappings from the raw-data space to the target space, each mapping of the first set of similarity mappings being based on a corresponding similarity measure of the determined similarity measures, and the first set of mappings comprising the first set of signal indicators.

4. The method according to claim 3, wherein the mapping of the training data from a raw-data space onto a target space is performed using a geometric nonlinear mapping function that is an iterated function system subject to an iteration limit.

5. The method according to claim 3, wherein the determining of the ontology for the training data is performed using the clustering that is one or more of a k-means clustering method and a distance-measure-based clustering method.

6. The method according to claim 3, wherein the determining of the similarity measures is performed using a Pearson correlation coefficient.

7. The method according to claim 3, wherein the estimating of the similarity mapping from the raw-data space to the target space based on the determined similarity measures is performed using a Shepard interpolation function.

8. The method according to claim 3, wherein the determining of the second set of signal indicators is performed by
    chaining and/or clustering the mapped training data using a conceptual-distance metric to generate a plurality of clusters in the target space, each cluster respectively being chained and/or clustered according to indistinguishability with respect to a corresponding basis of the respective cluster,
    determining, for each disjoint cluster in the target space, a closest mapping of a reference pattern of the respective references patterns onto the target space,
    determining, for each cluster of the plurality of clusters, a mapping of a second set of mappings from the raw-data space to the target space, each mapping of a second set of mappings corresponding to an indistinct membership of the first set of mappings relative to a respective cluster of the plurality of clusters, and
    determining the second set of signal indicators to be respective mappings from the first set of mappings to the second set of mappings.

9. The method according to claim 1, further comprising:
    grouping the first set of signal indicators, the second set of signal indicators, and the third set of signal indicators to generate a channel corresponding to the received reference patterns, the channel including
        a first data stream generated using the first set of signal indicators,
        a second data stream generated using the second set of signal indicators, and
        a third data stream generated using the third set of signal indicators;
    multiplying the first data stream by a logarithmic function to generate a first product and differentiating the first product with respect to time to generate a first spike train;
    multiplying the second data stream by a logarithmic function to generate a second product and differentiating the second product with respect to time to generate a second spike train; and
    multiplying the third data stream by a logarithmic function to generate a third product and differentiating the third product with respect to time to generate a third spike train.

10. The method according to claim 9, further comprising:
    approximating values of the first spike train at each cycle of a first clock by respective binary values;
    approximating the second spike train at each cycle of a second clock by respective binary values;
    approximating the third spike train at each cycle of a third clock by respective binary values; and partitioning the binary values of the first spike train, the second spike train, and the third spike train into time-windowed binary-bit codes, each time series of time-windowed binary-bit codes corresponding to one of the one or more semantic-boundary indices.

11. The method according to claim 10, further comprising:
determining respective prime-number identifiers to uniquely identify the time-windowed binary-bit codes, wherein
combinations of the respective prime-number identifiers together with the respective time-windowed binary-bit codes comprise the one or more semantic-boundary indices.

12. The method according to claim 10, wherein the first clock, the second clock, and the third clock are respectively Lamport clocks.

13. The method according to claim 1, wherein the one or more semantic-boundary indices comprises raw data of another raw data stream used to generate another one or more semantic-boundary indices.

14. The method according to claim 1, wherein the one or more semantic-boundary indices are generated using the raw data from the raw data stream that is another one or more semantic-boundary indices that are generated using raw data from another raw data stream.

15. The method according to claim 1, wherein the raw data from the raw data stream that is used to generate the one or more semantic-boundary indices includes the one or more semantic-boundary indices.

16. The method according to claim 1, further comprising:
obtaining another raw data stream;
generating another one or more semantic-boundary indices based on another one or more distinguishability data streams, another one or more indistinguishability data streams, and another one or more ignorance data streams, wherein the another one or more distinguishability data streams, the another one or more indistinguishability data streams, and the another one or more ignorance data streams of the another raw data stream are respectively generated by applying another first set of signal indicators, another second set of signal indicators, and another third set of signal indicators to the another raw data stream;
identifying prospective analogs between the raw data stream and the another raw data stream using similarities between the another one or more semantic-boundary indices and the one or more semantic-boundary indices; and
determining, using an analogy-reasoning engine, analogies between the raw data stream and the another raw data stream from the prospective analogs between the raw data stream and the another raw data stream.

17. The method according to claim 1, further comprising:
obtaining another raw data stream;
generating another one or more semantic-boundary indices based on another one or more distinguishability data streams, another one or more indistinguishability data streams, and another one or more ignorance data streams, wherein the another one or more distinguishability data streams, the another one or more indistinguishability data streams, and the another one or more ignorance data streams of the another raw data stream are respectively generated by applying another first set of signal indicators, another second set of signal indicators, and another third set of signal indicators to the another raw data stream;
generating structured relationships between the raw data stream and the another raw data stream to generate an analogical scaffolding; and
generating indicators that predict events based on the raw data stream, the indicators being generated based on the analogical scaffolding and based on other indicators that predict other events using the another raw data, wherein the other indicators are obtained previously.

18. The method according to claim 1, further comprising:
calculating a financial technical indicator using the one or more semantic-boundary indices as an input to the financial technical indicator; and
performing financial portfolio analysis on the financial technical indicator of the one or more semantic-boundary indices to predict transition points and/or cross-over points signaled by the raw data stream.

19. The method according to claim 1, further comprising:
obtaining another raw data stream;
generating another one or more semantic-boundary indices based on another one or more distinguishability data streams, another one or more indistinguishability data streams, and another one or more ignorance data streams, wherein the another one or more distinguishability data streams, the another one or more indistinguishability data streams, and the another one or more ignorance data streams of the another raw data stream are respectively generated by applying another first set of signal indicators, another second set of signal indicators, and another third set of signal indicators to the another raw data stream; and
identifying prospective analogs between the raw data stream and the another raw data stream using the similarities between the another one or more semantic-boundary indices and the one or more semantic-boundary indices by determining one or more of a correlation between the another one or more semantic-boundary indices and the one or more semantic-boundary indices, a distance measure between respective indices of the another one or more semantic-boundary indices and the one or more semantic-boundary indices, and a k-means clustering method.

20. The method according to claim 1, further comprising:
identifying a first set of times corresponding to surprise and/or anomalous events in the raw data stream;
identifying a second set of times corresponding to no surprise and/or no anomalous events in the raw data stream;
calculating moving averages of a technical indicator based on the one or more semantic-boundary indices;
performing statistical analysis of the moving averages to identify differences in the moving averages during the first set of times compared to during the second set of times;
determining respective surprise thresholds for the moving averages as a predefined fraction of the corresponding differences between the moving averages at the first set of times and the moving averages at the second set of times; and
signaling events corresponding to moving averages of the raw data stream that surpass the surprise threshold as being prospective surprise and/or anomalous events.

21. The method according to claim 20, wherein the statistical analysis performed on the moving averages includes calculating a skewness of the moving averages, a kurtosis of the moving averages, a deviation of the moving averages, and exponential moving averages of various of the one or more semantic-boundary indices.

22. The method according to claim 1, wherein the raw data stream is one or more of an unstructured data stream, a text data stream, a numeric value data stream, a financial securities data stream, and a time series of physical measurements.

23. An apparatus to perform data mining of a technical and/or semantic signal interpretation that is generated from a raw data stream of unstructured data, the apparatus comprising:
automated-agent circuitry configured to
obtain raw data from a raw data stream,
operate on the raw data according to a measurement rubric to generate measurements,
determine a first set of signal indicators based on a distinguishability metric representing a distinguishability among the generated measurements of the raw data,
determine a second set of signal indicators based on an indistinguishability metric representing an indistinguishability among the generated measurements of the raw data,
determine a third set of signal indicators based on an ignorance metric representing ignorance of the distinguishability and of the indistinguishability of the generated measurements of the raw data, the third set of signal indicators comprising signal indicators of a complement of a union between signal indicators of the first set of signal indicators and of the second set of signal indicators,
detect distinguishability indicators in the raw data stream by applying the first set of signal indicators to the raw data stream to generate one or more distinguishability data streams,
detect indistinguishability indicators in the raw data stream by applying the second set of signal indicators to the raw data stream to generate one or more indistinguishability data streams,
detect ignorance indicators in the raw data stream by applying the third set of signal indicators to the raw data stream to generate one or more ignorance data streams,
combine the one or more distinguishability data streams, one or more indistinguishability data streams, and one or more ignorance data streams to generate one or more semantic-boundary indices, and
output one or more technical and/or semantic interpretations of the raw data stream or one or more technical and/or semantic determinations of the raw data stream using the one or more semantic-boundary indices.

24. The apparatus according to claim 23, wherein the circuitry is further configured to operate on the raw data according to the measurement rubric such that the measurement rubric is one of a technical indicator of a financial or commodity security, a semantic distance measure, and a Resnik measure.

25. The apparatus according to claim 23, wherein the circuitry is further configured to
determine a set of patterns from the measurements, to generate training data,
map the training data from a raw-data space onto a target space, and the target space is a multi-dimensional vector space,
determine, using clustering, an ontology of the training data corresponding to the set of patterns from the measurements,
receive reference patterns based on interpretations of the raw data,
determine similarity measures between the set of patterns of the training data and the reference patterns, and
estimate a first set of mappings from the raw-data space to the target space, each mapping of the first set of similarity mappings being based on a corresponding similarity measure of the determined similarity measures, and the first set of mappings comprising the first set of signal indicators.

26. The apparatus according to claim 25, wherein the circuitry is further configured to perform the mapping of the training data from a raw-data space onto a target space using a geometric nonlinear mapping function that is an iterated function system subject to an iteration limit.

27. The apparatus according to claim 25, wherein the circuitry is further configured to perform the determining of the ontology for the training data using the clustering that is one or more of a k-means clustering method and a distance-measure-based clustering method.

28. The apparatus according to claim 25, wherein the circuitry is further configured to perform the determining of the similarity measures using a Pearson correlation coefficient.

29. The apparatus according to claim 25, wherein the circuitry is further configured to perform the determining of the second set of signal indicators by
chaining and/or clustering the mapped training data using a conceptual-distance metric to generate a plurality of clusters in the target space, each cluster respectively being chained and/or clustered according to indistinguishability with respect to a corresponding basis of the respective cluster,
determining, for each disjoint cluster in the target space, a closest mapping of a reference pattern of the respective references patterns onto the target space,
determining, for each cluster of the plurality of clusters, a mapping of a second set of mappings from the raw-data space to the target space based, each mapping of a second set of mappings corresponding to an indistinct membership of the first set of mappings relative to a respective cluster of the plurality of clusters, and
determining the second set of signal indicators to be respective mappings from the first set of mappings to the second set of mappings.

30. The apparatus according to claim 23, wherein the circuitry is further configured to
group the first set of signal indicators, the second set of signal indicators, and the third set of signal indicators to generate a channel corresponding to the received reference patterns, the channel including
a first data stream generated using the first set of signal indicators,
a second data stream generated using the second set of signal indicators, and
a third data stream generated using the third set of signal indicators,
multiply the first data stream by a logarithmic function to generate a first product and differentiating the first product with respect to time to generate a first spike train,
multiply the second data stream by a logarithmic function to generate a second product and differentiating the second product with respect to time to generate a second spike train, and multiply the third data stream by a logarithmic function to generate a third product and differentiating the third product with respect to time to generate a third spike train.

31. The apparatus according to claim 30, wherein the circuitry is further configured to approximate values of the first spike train at each cycle of a first clock by respective binary values, approximate the second spike train at each cycle of a second clock by respective binary values, approximate the third spike train at each cycle of a third clock by respective binary values, and partition the binary values of the first spike train, the second spike train, and the third spike train into time-windowed binary-bit codes, each time series of time-windowed binary-bit codes corresponding to one of the one or more semantic-boundary indices.

32. The apparatus according to claim 31, wherein the circuitry is further configured to determine respective prime-number identifiers to uniquely identify the time-windowed binary-bit codes, wherein combinations of the respective prime-number identifiers together with the respective time-windowed binary-bit codes comprise the one or more semantic-boundary indices.

33. The apparatus according to claim 31, wherein the circuitry is further configured to perform the approximating of the first clock, the second clock, and the third clock using respective Lamport clocks as the first clock, the second clock, and the third clock.

34. The apparatus according to claim 23, wherein the one or more semantic-boundary indices comprises raw data of another raw data stream used to generate another one or more semantic-boundary indices.

35. The apparatus according to claim 23, wherein the one or more semantic-boundary indices is generated using the raw data from the raw data stream that is another one or more semantic-boundary indices that are generated using raw data from another raw data stream.

36. The apparatus according to claim 23, wherein the raw data from the raw data stream that is used to generate the one or more semantic-boundary indices includes the one or more semantic-boundary indices.

37. The apparatus according to claim 23, wherein the circuitry is further configured to obtain another raw data stream, generate another one or more semantic-boundary indices based on another one or more distinguishability data streams, another one or more indistinguishability data streams, and another one or more ignorance data streams, wherein the another one or more distinguishability data streams, the another one or more indistinguishability data streams, and the another one or more ignorance data streams of the another raw data stream are respectively generated by applying another first set of signal indicators, another second set of signal indicators, and another third set of signal indicators to the another raw data stream, identify prospective analogs between the raw data stream and the another raw data stream using similarities between the another one or more semantic-boundary indices and the one or more semantic-boundary indices, and determine, using an analogy-reasoning engine, analogies between the raw data stream and the another raw data stream from the prospective analogs between the raw data stream and the another raw data stream.

38. The apparatus according to claim 23, wherein the circuitry is further configured to obtain another raw data stream, generate another one or more semantic-boundary indices based on another one or more distinguishability data streams, another one or more indistinguishability data streams, and another one or more ignorance data streams, wherein the another one or more distinguishability data streams, the another one or more indistinguishability data streams, and the another one or more ignorance data streams of the another raw data stream are respectively generated by applying another first set of signal indicators, another second set of signal indicators, and another third set of signal indicators to the another raw data stream, generate structured relationships between the raw data stream and the another raw data stream to generate an analogical scaffolding, and generate indicators that predict events based on the raw data stream, the indicators being generated based on the analogical scaffolding and based on other indicators that predict other events using the another raw data, wherein the other indicators are obtained previously.

39. The apparatus according to claim 23, wherein the circuitry is further configured to calculate a financial technical indicator using the one or more semantic-boundary indices as an input to the financial technical indicator, and perform financial portfolio analysis on the financial technical indicator of the one or more semantic-boundary indices to predict transition points and/or cross-over points signaled by the raw data stream.

40. A non-transitory computer readable storage medium including executable instructions for data mining to generate a technical and/or semantic signal interpretation that is generated from a raw data stream of unstructured data using circuitry, wherein the instructions, when executed by the circuitry, cause the circuitry to perform the steps of:

obtaining raw data from a raw data stream;

operating on the raw data according to a measurement rubric to generate measurements;

determining a first set of signal indicators based on a distinguishability metric representing a distinguishability among the generated measurements of the raw data;

determining a second set of signal indicators based on an indistinguishability metric representing an indistinguishability among the generated measurements of the raw data;

determining a third set of signal indicators based on an ignorance metric representing ignorance of the distinguishability and of the indistinguishability of the generated measurements of the raw data, the third set of signal indicators comprising signal indicators representing a complement of a union between signal indicators of the first set of signal indicators and of the second set of signal indicators;

discerning distinguishability indicators in the raw data stream by applying the first set of signal indicators to the raw data stream to generate one or more distinguishability data streams;

discerning indistinguishability indicators in the raw data stream by applying the second set of signal indicators to the raw data stream to generate one or more indistinguishability data streams;

discerning ignorance indicators in the raw data stream by applying the third set of signal indicators to the raw data stream to generate one or more ignorance data streams;

combining the one or more distinguishability data streams, one or more indistinguishability data streams, and one or more ignorance data streams to generate one or more semantic-boundary indices; and outputting one or more technical and/or semantic interpretations of the raw data stream or one or more technical and/or semantic determinations of the raw data stream using the one or more semantic-boundary indices.

* * * * *